Sept. 27, 1966
B. H. DUDSON
3,275,719
METHOD OF BUILDING IN SITU CONSTRUCTION
USING SEQUENTIAL MOLDING TECHNIQUES
Filed Aug. 7, 1963
5 Sheets-Sheet 1
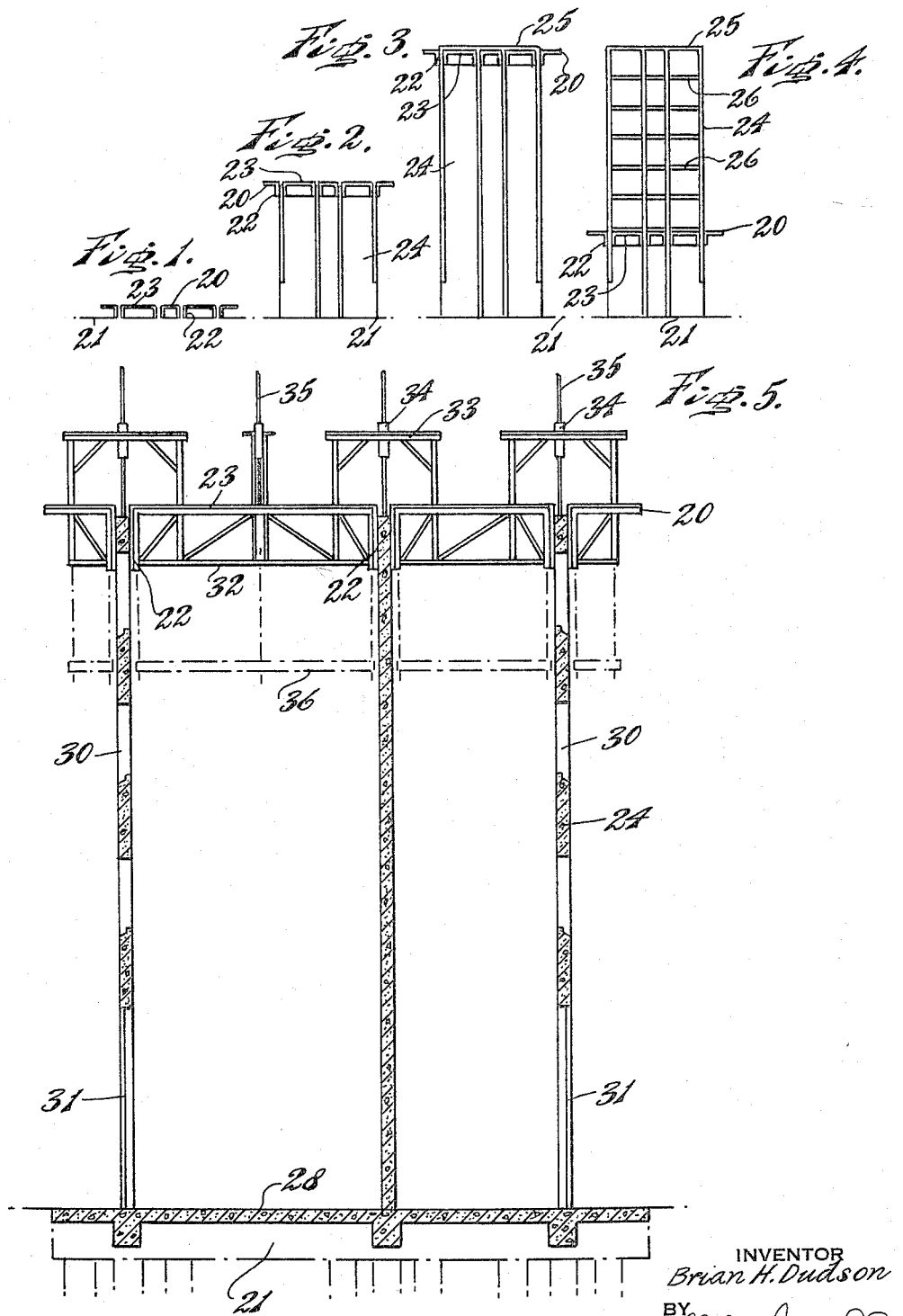
INVENTOR
Brian H. Dudson
BY
ATTORNEYS

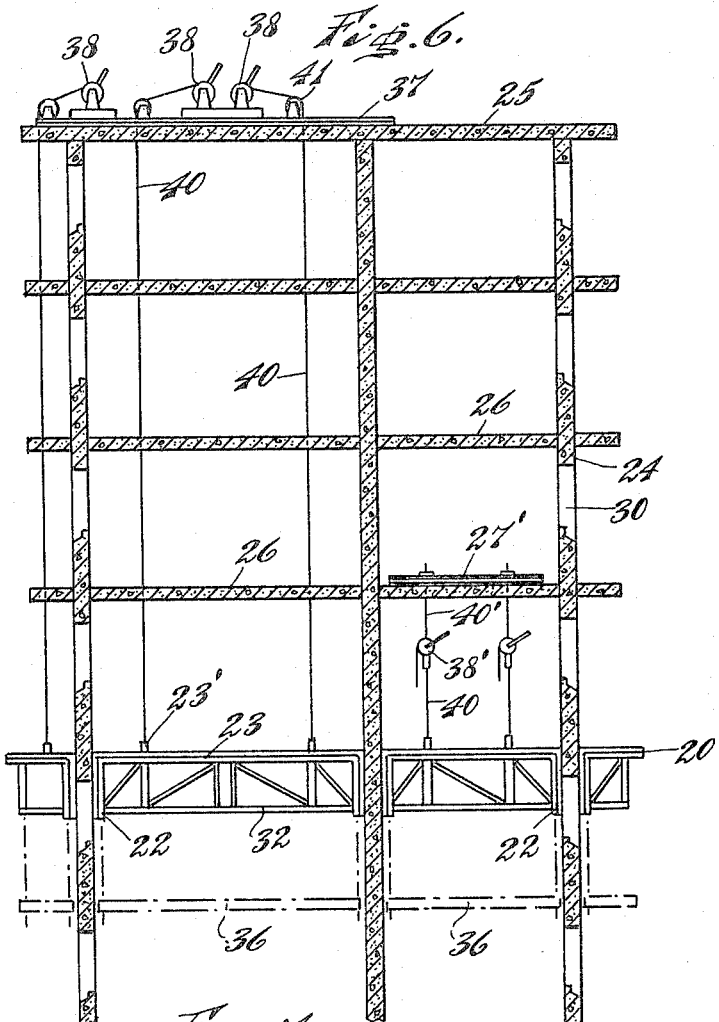
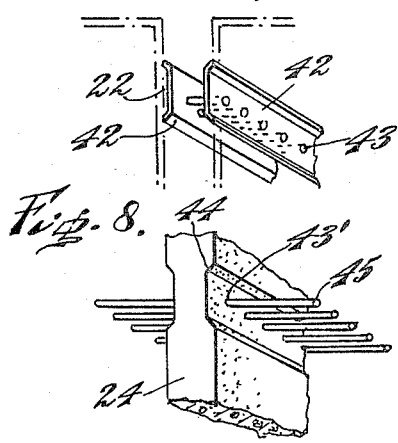
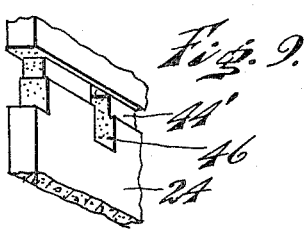
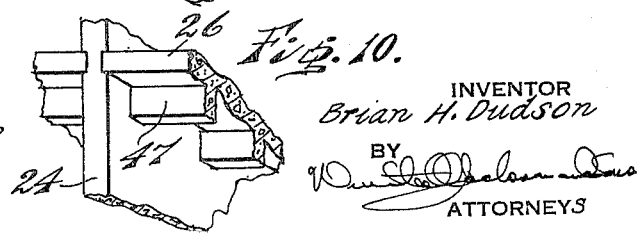

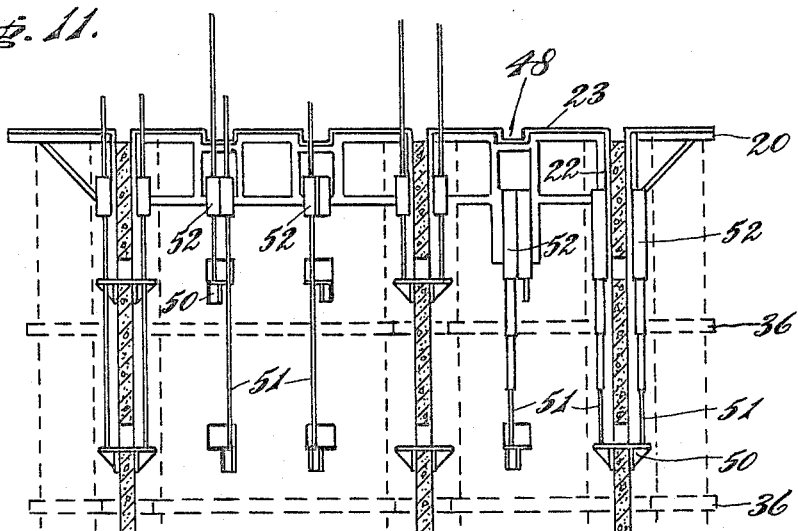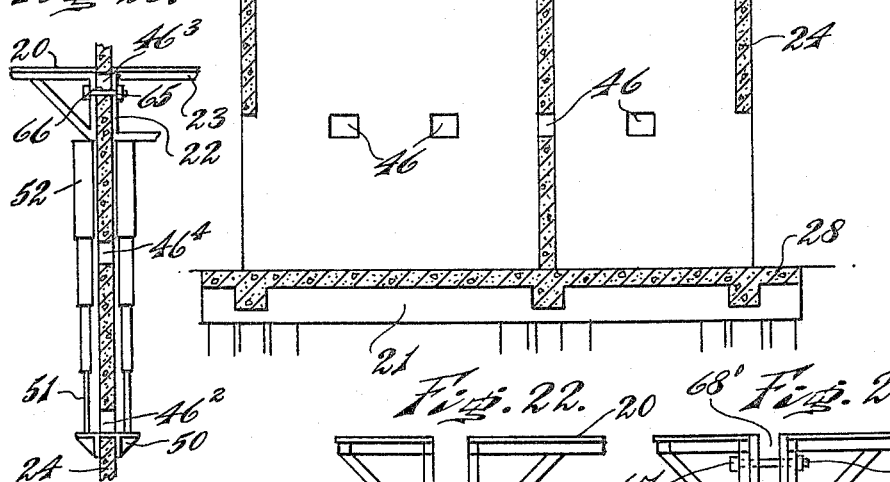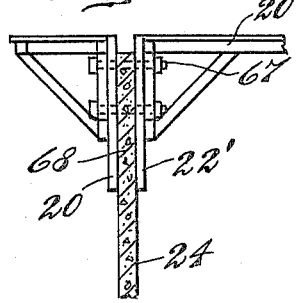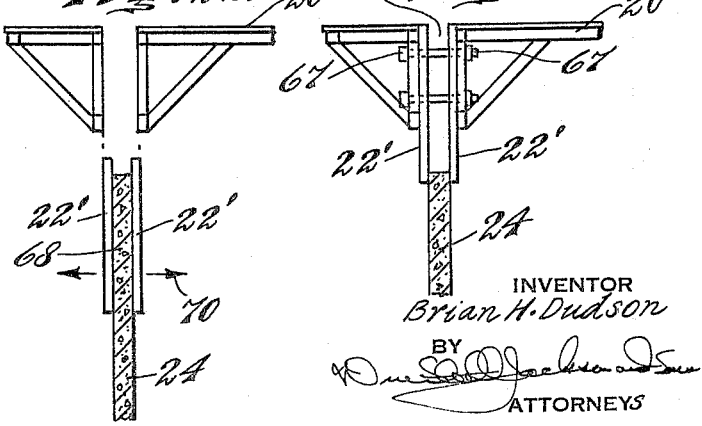

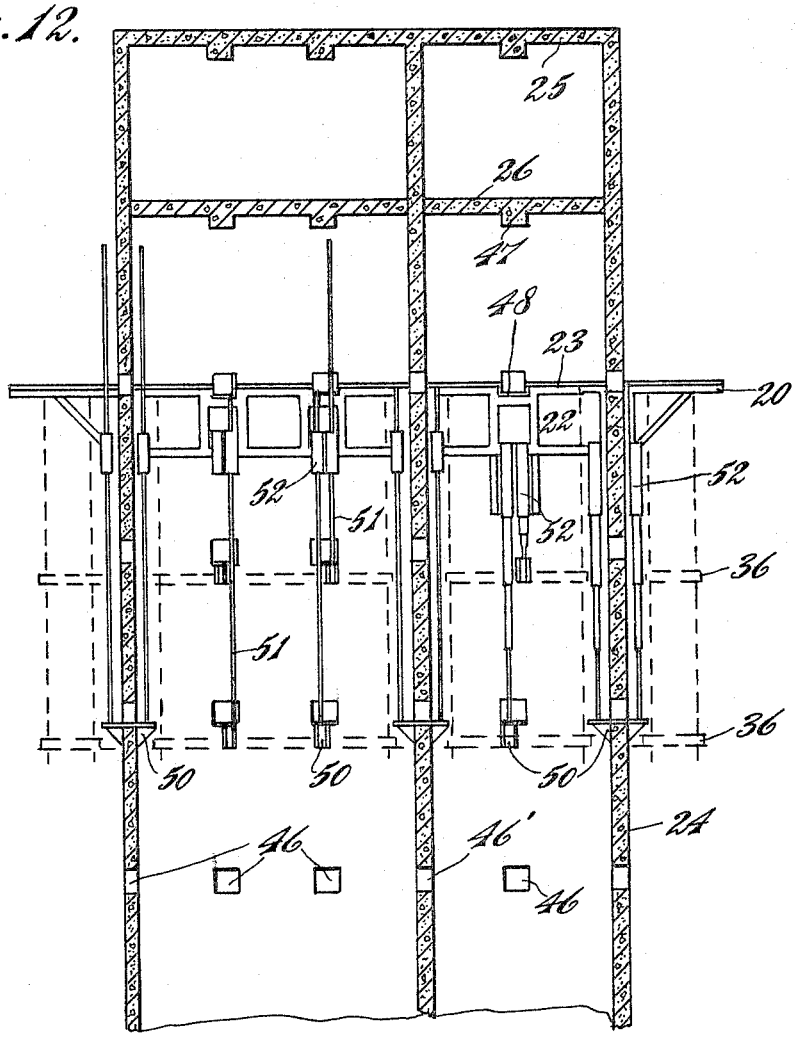

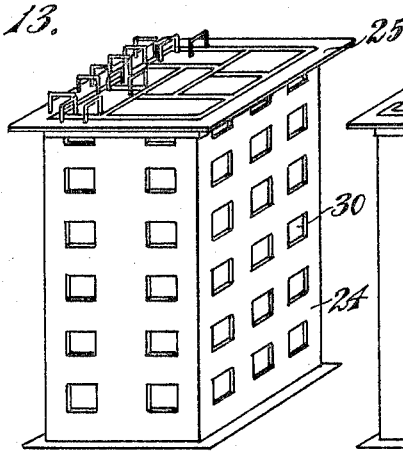
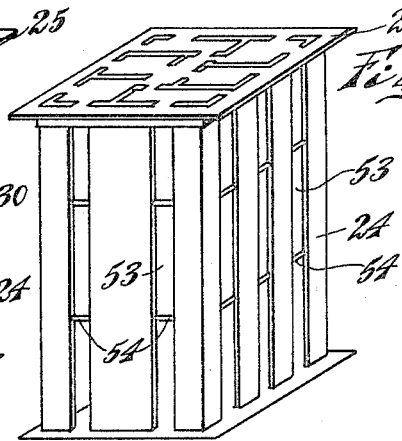
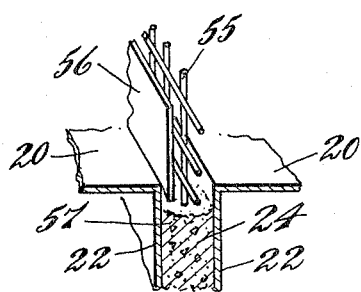
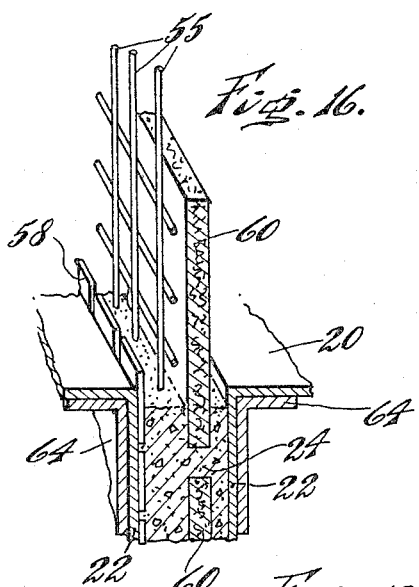
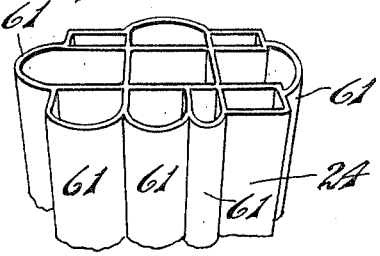
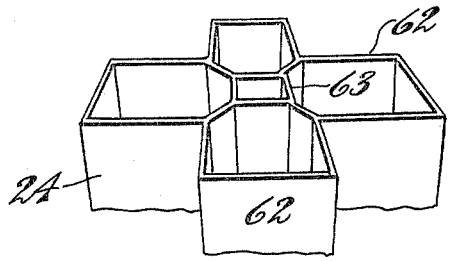
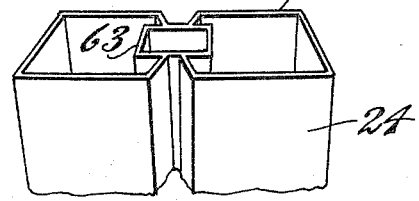

United States Patent Office 3,275,719
Patented Sept. 27, 1966

3,275,719
METHOD OF BUILDING IN SITU CONSTRUCTION USING SEQUENTIAL MOLDING TECHNIQUES
Brian H. Dudson, Philadelphia, Pa. (Box 5722, Wellesley St., Auckland, Auckland, New Zealand)
Filed Aug. 7, 1963, Ser. No. 300,476
2 Claims. (Cl. 264—33)

The present invention relates to a construction for concrete buildings, particularly reinforced concrete buildings, and especially multi-story buildings.

When reference is made herein to concrete it is intended to refer to what is technically known as concrete, and also other similar moldable and formable building materials, which are handled by similar techniques.

When reference is made herein to a floor of a building, generally, it is intended to include any horizontal slab, whether it would normally be called a floor, a roof, a deck, a balcony, or the like.

A purpose of the invention is to permit the construction of multi-story reinforced concrete buildings at lower cost and with less labor.

A further purpose is to provide a method for constructing a concrete building using a construction platform having as a part thereof forms for building the side walls of a building and also forms for pouring the floors of the building, which comprises pouring a small increment of the side walls while the construction platform is on the foundation and after the concrete has cured to progress the construction platform upwardly pouring additional increments of the side walls, wherein the construction platform is raised by lifting means applying load to the lower cured side walls.

A further purpose after the construction platform has completed the formation of the side walls is to pour a floor using horizontal forms on the construction platform and then lowered the construction platform to the next floor level and pour the next floor and so on down.

A further purpose is to mount the forms for the side walls on the construction platform but to permit them to be detached therefrom, to pour an increment of the side walls with the side wall forms in place, then to detach the side wall forms from the construction platform, next to raise the construction platform, next to break the bond between the concrete in the increment of the wall which has just been poured and the forms and reattach the forms to the construction platform at a higher level which connects with the side walls, and then proceed to pour another increment of the side walls.

A further purpose is to provide interlocks for the floors as the side walls are built, suitably by arranging for openings through which reinforcing or cross beams can be introduced or poured.

A further purpose is to jack, in raising the construction platform, from rods in prolongation of the side walls.

A further purpose is to jack by two sets of lifting means from the side walls, so that one set can shift its anchorage when the other set is operating.

A further purpose is to anchor the construction platform to the side walls and then raise the jacks to a higher level, and then further jack from the side walls to support the construction platform and release the anchorage of the construction platform to the side walls.

A further purpose is to jack from saddles in openings in the side walls.

A further purpose is to continuously extrude a facing on any desired wall.

A further purpose is to include continuously in the concrete heat insulating material during the formation of the side walls.

Further purposes appear in the specification and in the claims.

In the drawings I have chosen to illustrate a few only of the embodiments in which the invention may appear, selecting the forms shown from the standpoints of convenience in illustration, satisfactory operation, and clear demonstration of the principles involved.

FIGURE 1 is a diagrammatic side elevation of the device of the invention with the portion of the construction platform which would obstruct view of the interior taken away, and showing the construction platform resting on the foundation.

FIGURE 2 is a view similar to FIGURE 1, showing the side walls partially completed.

FIGURE 3 is a view similar to FIGURE 1 showing the side walls completed and the top floor (roof) also completed.

FIGURE 4 is a view similar to FIGURE 1 illustrating a more advanced stage of construction when more of the floors have been built.

FIGURE 5 is an enlarged diagrammatic vertical section showing the construction of the side walls of a building according to the invention.

FIGURE 6 is a fragmentary diagrammatic vertical section similar to FIGURE 5 showing a more advanced stage of construction in which several of the floors have been poured.

FIGURE 7 is a diagrammatic fragmentary perspective showing a means for making an interlock at a floor level.

FIGURE 8 is a fragmentary perspective showing the side walls at a floor level after reinforcing has been introduced to cast the floor.

FIGURE 9 is a fragmentary perspective presenting an alternate means for making an interlock at the floor level by providing openings in the side wall.

FIGURE 10 is a fragmentary perspective showing a completed floor, with beams extending into the openings below the floor.

FIGURE 11 is a diagrammatic section showing different mechanism for raising the construction platform, and illustrating the formation of the side walls.

FIGURE 12 is a view similar to FIGURE 11 but illustrating the pouring of the floors.

FIGURE 13 is a diagrammatic perspective showing a building being constructed according to the present invention with the use of conventional windows.

FIGURE 14 is a diagrammatic perspective showing a building being constructed according to the present invention and employing vertical recesses in the side walls into which windows will be placed.

FIGURE 15 is a diagrammatic perspective showing the extruding of a vertical wall provided with a facing.

FIGURE 16 is a diagrammatic perspective showing the extruding of a vertical wall provided with heat insulation.

FIGURES 17, 18, and 19 are fragmentary perspectives showing different architectural forms which can be taken by the side walls in a building constructed according to the present invention.

FIGURE 20 is a fragmentary vertical section similar to a portion of FIGURE 12 showing use of a single set of jacks and anchorage of the construction platform to the side walls in order to shift the jacks to a higher level.

FIGURE 21 is a diagrammatic fragmentary vertical section showing step-by-step production of the side walls. This view illustrates the first step.

FIGURE 22 is a view similar to FIGURE 21 showing the side wall forms detached from the construction platform and the construction platform raised to a new position while the side wall forms are broken away from the bond to the concrete.

FIGURE 23 is a view similar to FIGURE 22 showing the forms for the side walls raised to the higher level and again attached to the construction platform for pouring the next increment of the side walls.

Describing in illustration but not in limitation and referring to the drawings:

The most widely used technique for pouring concrete in situ employs temporary concrete forms which are built storey by storey and are dismantled after the concrete has been poured and has cured. Then the same forms or similar forms are used when the next storey is built.

A recent development in reinforced concrete construction known as the "slip form" method uses a continuously upwardly moving form which makes the side walls, cores, ducts, columns and other vertical elements. Then later the floors are constructed using conventional techniques.

According to the present invention a construction platform, or what might be called a building machine, is used which moves upwardly to construct the side walls and then moves downwardly to produce the floors. The need for special forms individual to each floor is thus avoided and the need for dismantling and reassembling forms unrepeatedly for each floor no longer exists.

According to the invention a construction platform is set up on the foundation which will move vertically continuously as in typical "slip form" construction, or in a series of increments, and as it moves upward will form the side walls of the building.

On reaching the top, the construction platform is used to pour the roof slab and then is lowered floor by floor to form the floor slab for each floor. When the lower-most floor above the foundation has been poured, the platform is removed, and suitably dismantled if necessary.

The invention makes it possible to construct a building at lower cost, with greater speed, with less labor, with less formwork, and with less scaffolding.

In FIGURE 1 I illustrate a construction platform 20 according to the invention resting on the foundation 21 and provided with side wall forms 22 and floor forms 23 for producing floor slabs.

It will be understood that since the side walls will normally form rooms without vertical openings or slots in the side walls, each portion or unit of the construction platform which defines surrounding side walls and a floor slab will be unconnected but will move up and down at a coordinated rate with all other portions of the construction platform.

Concrete is introduced in the vertical forms and suitably tamped and/or vibrated to form a dense mixture as desired. The concrete then is allowed to cure to the extent necessary to establish adequate strength in the side walls, as discussed below, and then the construction platform is lifted in one of the manners later described, the increments of lifting being determined by the extent to which the side wall has been cured so that the forms always remain on the side walls safely below any concrete which has not cured.

FIGURE 2 shows the condition when the construction platform has moved up about ½ the height of the building.

In FIGURE 3 the construction platform has been raised high enough to produce the entire side walls 24 and then it has been used to pour a roof slab 25 using the horizontal forms 23.

After the roof slab has cured, the construction form has been lowered to one floor level after another and at each one of these floor levels has been used to pour a floor slab 26 as shown in FIGURE 4.

FIGURE 5 shows in more detail one embodiment of construction platform and shows some of the aspects of the building itself with more particularity.

In this embodiment a foundation 21 is illustrated on which a foundation slab 28 has been poured by any suitable method. The side walls 24 of the building have conventional window openings 30 and suitable door openings not shown, and also on the ground floor have access openings 31 which can be used to remove portions of the construction platform when the lower-most floor above the foundation level has been completed.

In the embodiment illustrated in FIGURE 5, the construction platform has a truss under structure 32 which supports the vertical forms 22 and the horizontal forms 23 and has yokes 33 bridging each of the vertical walls. Above the center of each vertical wall the yokes carry jacks 34 which are of any suitable construction, hydraulic or mechanical, which grip on extension rods 35 suitably buried in the concrete as reinforcing and extending upward therefrom. When one rod terminates another rod is inserted and jacking continues. The jacks themselves are of a character well known in the art.

Beneath the construction platform and indicated in phantom to suggest light construction, are provided scaffolds 36 which may be used by the workmen concerned with various auxiliary operations such as finished of side walls by sandblasting or otherwise they may be used also by those who are jacking when jacking is done from below as later explained.

In the form of FIGURE 5 it is most convenient to shift from the lifting means illustrated when the roof slab has been poured.

This is shown in FIGURE 6 where a base frame 37 has been provided on the roof 25, on which hoists 38 are mounted, which manipulate hoisting cables 40 over pulleys 41. Suitable openings have been provided in the roof slab and in each floor slab to admit the cables. Suitable wooden blocks 23' surround the cables at the horizontal forms 23 to form the openings.

In some cases it is convenient to move the hoisting mechanism after several lower floors have been provided, and at the right of FIGURE 6 an anchorage 27' is provided on a lower floor to secure cables 40' which hold hanging hoists 38' to manipulate hoisting cables 40, supporting a portion of the construction platform.

Various methods of tying-in the side walls with the floors can be employed of which two only will be illustrated, but it will be evident that numerous other techniques can be used.

In FIGURE 7 I show opposed channels 42 which rest inside the line of the side wall forms 22 and against them. Cross-connecting the channels 42 are suitably wood blocks 43 (although steel tubes can be used if desired).

As a result when the construction platform has moved past the floor level, the channels 42 are removed together with the wood blocks 43 to provide openings 43'. As shown in FIGURE 8 the side wall has recesses 44 on opposite sides at the floor level and openings 43' through which reinforcing rods 45 can be inserted and tied in with the other reinforcing used in pouring the floor.

FIGURE 9 shows a different technique. In this case at the floor level a recess 44' has been produced and also a "window" 46 has been formed which extends adequately below the floor level.

When the floor slab 26 is cast it extends through the "window" 46 and cast integral with it and with suitable reinforcing extending across through the "window" 46 are beams 47. These beams are suitably allowed for by providing in the horizontal forms 23 suitable recesses 48 shown in FIGURE 11.

The embodiment of FIGURES 11 and 12 utilize a somewhat different type of platform and a somewhat different method of lifting and lowering.

In this embodiment "windows" 46 are produced at each floor level for the purpose of tying-in beams 47. These "windows" however, perform an auxiliary function. Suitably steel saddles 50 rest in the windows and provide anchorage for vertical steel rods 51 either side of the vertical walls which are engaged by jacks 52 secured to the platform.

The jacks are in pairs so that one jack is always operating to lift while another adjoining jack is being connected to a saddle at an upper floor level in raising as shown in FIGURE 11, or at a lower floor level in lowering as shown in FIGURE 12.

Accordingly, one set of jacks is always operating on the appropriate rods secured to saddles in the "window" at one level while another set of jacks is preparing to take over the function by operating in saddles located at a different level.

While in many cases it will be entirely proper to build a building having normal windows 30 for ventilation and light as shown in FIGURE 13, in some cases it may be desired to use window panels and have vertical recesses 53 as illustrated at FIGURE 14. At suitable levels crossties 54 may be provided to provide adequate strength in the side walls before the floors are introduced. The crossties 54 can be temporary cross-ties or permanent cross-ties as desired.

There may be a problem in obtaining adequate treatment for exposed walls. In some cases the surface created after sand blasting or otherwise surface treating is not adequately interesting. I illustrate in FIGURE 15 a technique for applying a surface layer during the extrusion of the side wall. Steel reinforcing 55 of the side wall 22 is placed so that it will not interfere with a shield 56 which runs vertically longitudinally across the top of the form, with its lower edge always just at the top of the concrete. It can simply float thus as the concrete and be pulled upward as the forms rise. A special surface concrete mix 57 is poured into place adjoining the outside surface (or the inside surface or both surfaces), and a particularly attractive surface treatment can be obtained in this way.

In FIGURE 16 I illustrate the inclusion of surface blocks or panels 58 during the extrusion operation. These can be of metal, refractory, plastic or any combination of the same, and they enter the form as the wall is poured.

I also illustrate the inclusion in the concrete as it is poured, on the side of the reinforcing rods 55 toward the inside of the building, of heat insulating blocks 60 which form a monolithic portion of the wall and tend to increase the resistance to heat transfer. Sound deadening material can also be included in this way.

One of the great advantages of the invention from the standpoint of the architect is that it permits a wide variety of contours of vertical walls. Thus in FIGURE 17 I show curved vertical walls 61 which are made at a minimum expense by the present invention. In FIGURE 18 I show large non-rectangular wings 62 on a building provided with rectangular interior walls 63. In FIGURE 19 this contour is expanded to permit four wings.

The invention thus lends itself well to producing buildings of unusual and attractive designs.

In some cases it will be preferable to use a single set of jacks to raise the construction platform, but to anchor the construction platform to the side walls during the time when the jacks must be raised to a higher level.

In FIGURE 20 which resembles FIGURE 11, the construction platform 20 is supported by jacks 52 acting on jacking rods 51 from saddles 50 which are positioned in suitable openings $46^2$. When the side walls have reached a convenient point near the limit of jacking length, and it is desired to raise the jacks, conveniently at a position at which the construction platform is opposite a higher set of openings $46^3$ in the side wall, bolts or other suitable fastening means 65 are inserted through suitable openings 66 in the side wall forms 22 to rest on the bottom of the upper openings $46^3$ and support the construction platform. At that point the jacks can be raised and the saddles placed in the intermediate openings $46^4$ which are above the openings $46^2$. This has the advantage of using only a single set of jacks rather than requiring two sets of jacks.

In some cases it is decidedly preferable to pour the side walls in increments intermittently. One reason may be a desire to avoid work at certain times of the day either because of unfavorable weather conditions, or to avoid overtime pay for workmen.

The mechanism shown in FIGURES 21 to 23 is specially suited for use for this purpose. In this mechanism the side wall forms 22' are detachable from the construction platform 20 and are secured thereto in any suitable manner as by screws 67.

As shown in FIGURE 21 a lower increment of the wall has been poured at 68. Then the screws 67 are removed, releasing the side wall forms 22' from the construction platform 20. Next, as shown in FIGURE 22, the construction platform is raised to a position above the wall increment 68 but the side wall forms remain attached to the increment of wall 68 due to the concrete bond. While the concrete is still rather fresh, however, the side wall forms are detached from the increment of wall 68 by breaking the bond, suitably by pulling the side wall forms outwardly with or without pounding, as suggested by the arrows 70.

Then after any desired cleaning of the side wall forms 22' they are raised to the higher level and secured at the higher level by the screws 67 as shown in FIGURE 23 providing a space 68' connecting with the side wall into which the next increment of the side walls can be poured.

This process can go on indefinitely until the entire wall has been completed.

It will be evident that the question of the material of which the forms are made and the manner used to prevent adherence between the concrete and the forms is not critical in the present invention. The forms can be made of wood, metal or other suitable material. The forms can also be provided with a parting compound such as grease to prevent adherence to the concrete. The forms can also be separated from the concrete by providing a layer of pliable sheet of plastic or the like interposed between the concrete and the form, suitable materials being cellulose acetate, polyvinyl chloride, nylon, polyethylene and the like.

It will be of course understood that the concrete can be introduced by lifting in containers or pumping or otherwise.

It will of course be understood that all vertical ducts, pipes, and the like can be poured continuously along with the side walls.

It will be understood that all auxiliary floor slabs such as balcony slabs will be cast with the floors. This also will be true of all auxiliary roofs, such as balcony roofs.

It will of course be evident that any suitable technique will be used to permit rapid setting of the concrete. A high early strength cement will be desirable. Also it will be desirable to use accelerators in some cases. Curing of the concrete can also be aided by heating and heating means can be included in the forms. These are shown at 64 in FIGURE 16.

It will be evident that the forms are reusable and can be employed on construction of other buildings. If a particular part such as the actual face of a form wears abnormally, it can be replaced while the construction platform itself is reused.

In view of my invention and disclosure variations and modifications to meet individual whim or particular need will doubtless become evident to others skilled in the art, to obtain all or part of the benefits of my invention without copying the method or composition shown, and I therefore claim all such insofar as they may fall within the reasonable spirit and scope of my claims.

Having thus described my invention, what I claim as new and desire to secure by Letters Patent is:

1. A method of making a concrete building, which comprises setting up at the building site a construction platform comprising vertical forms for side walls of the building and horizontal forms for floors, building side walls of concrete contained within the vertical forms, leaving openings at spaced intervals extending through the walls as they are formed, placing support platforms through these openings in the walls, supporting the construction platform and raising it after the concrete has cured from beneath the platform by jacking means resting on and applying load to said platforms, pouring the side walls continuously until the desired top is reached, then pouring a floor using the horizontal forms, lowering said construction platform after the concrete cures and supporting it with the same jacking means by again applying load to the support platforms to the level of the next succeeding floor desired, pouring said floor and successive ones downwardly by lowering the platform each time, until the lowermost floor is reached, wherein the lifting and lowering of the construction platform is accomplished by a series of jacking means, which comprises supporting the building platform by a first jacking means applying load to a support platform, moving said building platform with the jacking means to a desired level, subsequently shifting support of the building platform to a second jacking means applying load to another support platform for support and movement of the building platform to the next desired level, and repositioning said first jacking means on yet another support platform for acceptance of successive support and movement of the building platform after movement by the second jacking means.

2. A method of making a concrete building, which comprises setting up at the building site a construction platform comprising vertical forms for side walls of the building and horizontal forms for floors, building side walls of concrete contained within the vertical forms, leaving openings at spaced intervals extending through the walls as they are formed, placing support platforms through these openings in the walls, supporting the construction platform and raising it after the concrete has cured from beneath the platform by jacking means resting on and applying load to said platforms, pouring the side walls continuously until the desired top is reached, then pouring a floor using the horizontal forms, lowering said construction platform after the concrete cures and supporting it with the same jacking means by again applying load to the support platforms to the level of the next succeeding floor desired, pouring said floor and successive ones downwardly, by lowering the platform each time, until the lowermost floor is reached, wherein the lifting and lowering of the construction platform with the jacking means is accomplished by supporting and moving said building platform to a desired level with the jacking means by applying load to a support platform, anchoring said building platform to the walls after movement to the desired level, releasing said jacking means and repositioning it on another support platform at a different level for reacceptance of support of the building platform for movement of it to the next level after releasing the building platform from the walls, by the jacking means again applying load to a support platform.

References Cited by the Examiner

UNITED STATES PATENTS

| | | | |
|---|---|---|---|
| 789,988 | 5/1905 | Metcalf | 264—33 |
| 1,096,792 | 5/1914 | Mumford | 264—33 |
| 1,617,746 | 2/1927 | Denger | 25—131 |
| 1,701,113 | 2/1929 | Keller | 264—33 |
| 1,791,646 | 2/1931 | Sproul | 264—33 |
| 1,862,544 | 8/1932 | McWane | 264—33 |
| 1,891,160 | 12/1932 | Jespersen | 264—33 |
| 2,275,738 | 3/1942 | Daric | 25—131 |
| 2,414,310 | 1/1947 | Laird | 264—32 |
| 2,620,543 | 12/1952 | Scharsach | 25—131 |
| 2,705,359 | 4/1955 | Strandberg | 264—33 |

FOREIGN PATENTS

| | | |
|---|---|---|
| 167,316 | 5/1590 | Austria. |
| 1,336,119 | 7/1963 | France. |
| 76,959 | 6/1950 | Norway. |

OTHER REFERENCES

Concretor, B. M. Heeds, Inc., 1949, pages 4–32 relied upon.

Engineering New Record, October 1947, vol. 72, page 506.

ROBERT F. WHITE, *Primary Examiner.*

ALEXANDER H. BRODMERKEL, *Examiner.*

R. B. MOFFITT, *Assistant Examiner.*